Feb. 13, 1951     F. C. P. HENROTEAU     2,541,057
METHOD AND APPARATUS FOR FORMING OPTICAL DEVICES
Filed Jan. 27, 1945
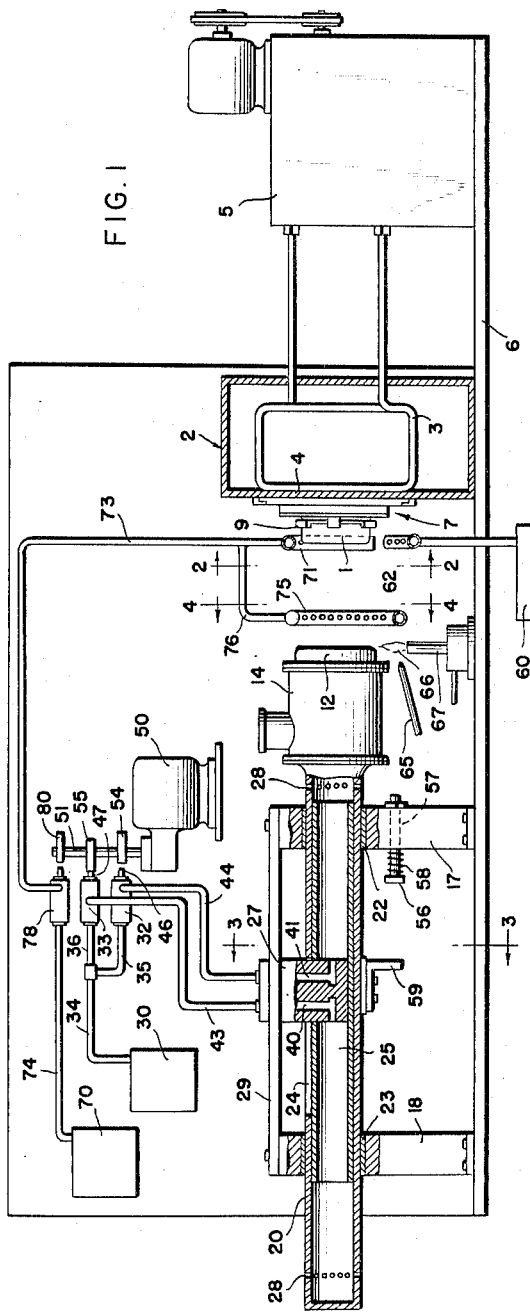
INVENTOR
FRANCOIS C. P. HENROTEAU
BY
ATTORNEY Patented Feb. 13, 1951

2,541,057

UNITED STATES PATENT OFFICE 2,541,057

METHOD AND APPARATUS FOR FORMING OPTICAL DEVICES

François Charles Pierre Henroteau, Fort Wayne, Ind., assignor, by mesne assignments, to Farnsworth Research Corporation, a corporation of Indiana Application January 27, 1945, Serial No. 574,910

19 Claims. (Cl. 41—9)

This invention relates to a method and apparatus for manufacturing optical devices and more particularly to a method and apparatus for forming lenses of glass materials.

The use of glass materials for high quality lenses is well known in the optical art, particularly in devices such as cameras or telescopes, where it is only required that a lens have a simple curvature. However, glass lenses are comparatively expensive to manufacture even though they have a surface of simple curvature or, in other words, a surface of revolution. They require extremely lengthy, tedious and meticulous grinding operations whereby the lens is the most expensive component of a high quality camera or telescope. Thus, the cost of such equipment can be substantially reduced only by reducing the cost of its lens or lens system.

Glass lenses are not only expensive to manufacture but they are also found to be wanting in several other respects. It is substantially impossible with conventionally formed lenses to form optical images which, by scientific standards, are representative of an original image. For example, glass lenses may be cast to the desired configuration, but cast lenses are found to include minute bubbles of air which, of course, cause distortion of the optical image. Furthermore, there is great difficulty in casting a glass lens in such fashion that it will cool into the desired curvature. The forms used for casting may be accurate so that in its heated condition the lens may have the desired curvature but shrinkage in different portions of the lens causes such deformation of the curvature that, scientifically speaking, the final product has an entirely different configuration from that originally intended.

Glass lenses may also be ground to the desired configuration. The conventional grinding process usually consists of machine grinding almost to the final curvature of the lens and final grinding and polishing are usually done manually in an attempt to obtain the required accuracy of curvature. The difficulty of manually grinding a lens to within .0001 inch of the desired curvature is obvious to those skilled in the art. Thus, ground lenses are not only undesirable from the standpoint of accuracy but also are not adapted to mass-production methods. Furthermore, only surfaces of revolution can be ground by machine whereby it is impossible to grind by machine lenses of complex curvature. Thus it is seen that conventional methods of forming glass lenses are not adapted efficiently to provide scientifically accurate lenses. Also, it is possible by conventional methods to form only lenses having surfaces of revolution.

Accordingly, the principal object of this invention is to provide a novel method and apparatus for forming lenses of glass materials.

Another object of this invention is to provide a method and apparatus for forming, to a high degree of accuracy, glass lenses by a process of controlled chemical decomposition.

Still another object of this invention is to provide a method of forming lenses by controlled chemical decomposition of glass.

In accordance with the invention, there is provided a method and apparatus for forming glass optical devices by controlled chemical decomposition. A glass blank and an acid film-forming apparatus are disposed adjacent to one another for providing a thin film of acid such, for example, as sulphuric acid on a surface of the glass blank. A mold having the negative configuration of the desired lens is movably mounted in alignment with the glass blank for movement into and out of contact with the blank. A source of vaporized fluorine-bearing salt is disposed adjacent the path of movement of the mold for providing a thin film of the salt on the surface of the mold. There is also provided adjacent the blank and adjacent the path of movement of the mold, a source of gaseous substance which periodically may be made effective to clean the surfaces of the mold and of the blank for removing the films formed thereon.

The foregoing apparatus is adapted to form at the points of contact between the mold and the blank a thin film of hydrofluoric acid which acts chemically to decompose thin layers of glass after each contact of the mold with the blank. After each such contact, the surfaces of the mold and of the blank are subjected to a cleaning action of a gaseous substance for removing the films. By repeating the foregoing process a great many times, it is possible to form a surface on a glass blank which accurately conforms to the configuration of the mold.

For a better understanding of the invention, together with other and further objects thereof, reference is made to the following description, taken in connection with the accompanying drawings, and its scope will be pointed out in the appended claims.

In the accompanying drawings:

Fig. 1 of the drawings is a side elevation, partially in section of apparatus adapted to carry out the invention;

Fig. 2 is a view taken on line 2—2 of Fig. 1;

Fig. 3 is a sectional view taken on line 3—3 of Fig. 1; and

Fig. 4 is a view taken on line 4—4 of Fig. 1.

Referring to Fig. 1 of the drawings, there is provided in accordance with this invention a glass lens blank 1 which may be in the form of a rectangular block or approximately of the form of the lens which it is desired to produce. For example, the blank may initially be ground by a conventional process to have the approximate configuration of the desired lens.

The blank 1 is disposed in contact with a cooling apparatus consisting of a heat-conducting container 2 and a cooling coil 3, the convolutions of which are disposed in part in intimate contact with container 2 as at wall 4. Coil 3 is connected, as illustrated in Fig. 1, with a refrigerating apparatus 5. The entire cooling apparatus is mounted on base 6 by means of conventional fastening means. For adjustably and accurately positioning blank 1 with respect to container 2, there is provided a conventional clamping apparatus 7 fixed to wall 4 and having adjustable jaws 9 which engage the blank for positioning it in intimate heat-conducting contact with the wall 4 of container 2.

For forming an optical surface on the blank 1, there is provided a mold 12, the right-hand surface of which (Fig. 1) has the negative configuration of the optical surface which it is desired to form on the blank. The mold 12 may consist of a metallic body, for example, coated with a film of platinum. Such a film may be electrolytically formed or it may be formed in accordance with other convention procedures. The mold 12 is supported at one end of a tank 14 which is provided for maintaining the mold at a comparatively low temperature as will appear hereinafter in the description. The tank may be filled with a suitable fluid such, for example, as water, the boiling temperature of which is within the temperature range it is desired to maintain.

For moving the mold 12 into and out of contact with the blank 1, there is provided a reciprocating mechanism consisting of vertical supports 17 and 18 together with a cylinder 20 which is supported in bearings 22 and 23 in the supports 17 and 18, respectively. The supports 17 and 18 are bolted, riveted or otherwise firmly fixed to the base member 6 whereby the reciprocating member 20 may be moved through a predetermined path with respect to the blank 1.

For reciprocating the cylinder 20, there is provided an inner cylinder 25 fixed to a depending member 27 which is in turn fixed to a strut member 29. Member 29 is fixedly supported between the members 17 and 18. Cylinder 20 is slotted as at 24 in register with depending member 27 whereby the cylinder is permitted to reciprocate with respect to the member. Cylinder 20 is also provided with exhaust ports 28, the purpose of which will be evident from subsequent explanation.

For moving the reciprocating cylinder 20, there is provided a source of compressed air or other gas 30 and the valves 32 and 33 which are connected to source 30 through the tubes 34, 35 and 36. Valves 32 and 33 are connected to channels 40 and 41 in member 27 by means of the tubes 43 and 44. Valves 32 and 33 include plungers 46 and 47 which are arranged to open or close the valves. For operating plungers 46 and 47, there is provided a motor 50 for driving a shaft 51 on which are fixed cam members 54 and 55. These cams are cut and disposed on shaft 51 in such a manner as to open valve 32 and close valve 33 or to open valve 33 and close valve 32. Thus when valve 32 is open, air pressure is built up in the right-hand chamber (Fig. 1) of cylinder 20 and when valve 33 is open, pressure is built up in the left-hand chamber of cylinder 20. When the pressure is impressed on the right-hand chamber of cylinder 20, mold 12 is moved to the right into contact with blank 1 and after such contact is established, the valves are operated whereby the pressure is removed from the right-hand chamber of cylinder 20 by ports 28 and built up in the left-hand chamber of cylinder 20 thereby to move mold 12 in the opposite direction away from blank 1.

For preventing the mold from damaging the lens blank and for limiting the motion to the right, there is provided a spring-biased member 56 movably supported in support 17 at 57. Spring 58 biases member 56 to the normal position shown in Fig. 1. For engaging member 57, there is provided member 59 adjustably fixed to cylinder 20. Spring 58 is designed so as to decelerate cylinder 20 just prior to engagement of mold 12 with blank 1. Thus there will be only slight impact between the mold and the blank, thereby to prevent the mold from damaging the blank.

For forming a film of acid on the surface of blank 1, there is provided a source 60 of, for example, vaporized sulphuric acid. The source is connected through tube 61 with, for example, an arcuate tube 62 which is perforated at a plurality of points as at 63 (Fig. 2) to create an atmosphere of vaporized acid about the surface of blank 1. Since this surface is cooled by the cooling coil 3, a thin film of acid is condensed on the surface of the blank.

For forming a thin film of a fluoride bearing salt on the surface of mold 12, there is provided a source 65 of, for example, potassium fluoride or sodium fluoride which is disposed in contact with flame 66. The flame 66 may be produced by, for example, a Bunsen burner 67. Flame 66 serves to vaporize the fluoride bearing salt and since the surface of mold 12 is relatively cool, there is condensed thereon a film of fluoride bearing salt. As described hereinbefore, tank 14 is provided for the purpose of cooling mold 12 and it is contemplated that flame 66 will boil the fluid in tank 14 whereby the surface of mold 12 is constantly maintained at the boiling temperature of the fluid.

For removing the films on the surfaces of blank 1 and mold 12, there is provided a source 70 of steam, for example. Disposed adjacent the surface of blank 1 is an arcuate member 71 which is perforated at a number of points as at 72 (Fig. 2) and connected by tubes 73 and 74 with source 70. There is provided adjacent the path of movement of mold 12 another arcuate member 75 (Fig. 4) which is connected to tube 73 by tube 76. Member 75 is perforated in a manner similar to member 71 whereby the surface of mold 12 may be subjected to a blast of steam for removing the film thereon.

For timing the cleaning periods, there is connected between tubes 73 and 74 a valve 78 similar to valves 32 and 33. For operating the plunger 79 of valve 78 there is provided on shaft 51 a third cam 80 which is cut and disposed on the shaft in such a manner that plunger 79 is operated to open valve 78 as mold 12 recedes from blank 1 and is approximately in register with the perforations of member 75.

For forming a glass lens in accordance with this invention, the blank 1 is clamped in heat-transferring relation with respect to container 2 by the clamping members 9. Members 9 are adjusted to hold blank 1 in predetermined position with respect to mold 12 whereby the surface to be formed will be accurate with respect to the mold. Motor 50 is energized to rotate cams 54 and 55 thereby successively to open and close valves 32 and 33. Compressed air from source 30 is admitted by the valves through tubes 34, 35, 36, 43 and 44 to first one and then the other chamber of cylinder 20 whereby mold 12 moves into and out of contact with the surface of blank 1. Exhaust ports 28 in cylinder 20 are of such size and number that they do not prevent the building up of operating pressure. On the other hand, ports 28 permit a sufficient exhaust of air in one chamber so that increase of pressure in the other chamber may move the cylinder. The source 60 and tube 62 provide an atmosphere of vaporized sulphuric acid about the surface of blank 1 whereby a film of sulphuric acid is condensed on the surface of blank 1. A fluorine bearing salt film is formed on the surface of mold 12 by source 65 and flame 66 as described hereinbefore.

As mold 12 moves toward the blank 1, it eventually contacts the high points on the blank and at the points of contact the fluorine bearing salt film on the mold combines with the film of sulphuric acid on the blank. This produces a chemical reaction at the points of contact as indicated by the following:

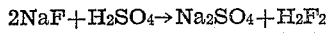

When this reaction occurs, the glass at the high points is acted upon as follows:

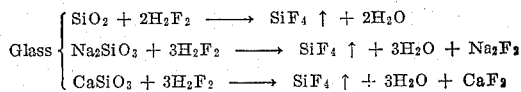

From the foregoing, it is apparent that a minute layer of glass is removed at each point of contact between the mold and the blank. It is also apparent that at each point of contact there is on the mold and on the blank a thin layer of the products of decomposition such, for example, as water, sodium fluoride and calcium fluoride.

The above described reaction occurs during and after the period of contact between the mold and the blank, and the reaction may be allowed to continue during any desired period of the return stroke of member 20 and mold 12. After the desired interval, the cam 80 operates valve 78 whereby steam under high pressure flows from members 71 and 75 to forcibly remove the films from blank 1 and mold 12 and stop the chemical reaction. Thus, after each contact of the mold and the blank, minute quantities of glass are removed from the blank. It is to be noted that steam should flow when mold 12 is adjacent the member 75. Also, member 75 may be positioned to allow the desired reaction period.

The foregoing cycle of operation is repeated until the entire surface of the blank 1 is engaged by the surface of the mold at which time the operation of the apparatus is terminated and a finished lens surface is produced. Member 59 may be adjusted with respect to cylinder 20 to determine with accuracy the extreme limit of motion of cylinder 20 thereby effectively to terminate the formation of the lens surface.

The advantages of this invention are apparent from the foregoing description. It is to be noted that since extremely minute quantities of glass are removed at each contact of the mold and the blank, an extremely accurate surface is formed on the blank. The process is not limited to the formation of surfaces of revolution but any type of optical surface may be formed in accordance with the surface of the mold. Highly skilled workmanship is entirely unnecessary and the time of formation is materially reduced whereby to reduce materially the cost of the lens.

It is not intended that this invention shall be limited to the specific apparatus disclosed herein. For example, it is within the scope of this invention to support the lens blank on the reciprocating member 20 and to support the mold in such fashion that the lens blank may be moved into engagement therewith. Also it is within the scope of this invention to condense on the mold a film of sulphuric acid and to condense on the blank a film of fluoride bearing salt. It is not necessary that the specific type of apparatus for moving the mold be utilized in carrying out the invention as various other types of reciprocating apparatus are equally adaptable.

While there has been described what is at present considered the preferred embodiment of the invention, it will be obvious to those skilled in the art that various changes and modifications may be made therein without departing from the invention, and it is, therefore, aimed in the appended claims to cover all such changes and modifications as fall within the true spirit and scope of the invention.

What is claimed is:

1. Apparatus for forming glass optical devices by controlled decomposition of a glass blank comprising a mold mounted for movement into and out of contact with said blank, means for intermittently moving said mold into contact with said blank, means for intermittently producing a film of a glass attacking composition on said blank at the points contacted by said mold and means for intermittently removing said film.

2. Apparatus for forming glass optical devices by controlled decomposition of a glass blank comprising a mold mounted for movement into and out of contact with said blank, means for intermittently moving said mold into contact with said blank, means for producing a film of a glass attacking composition on said blank at the points contacted by said mold and means for intermittently cleaning the surfaces of said mold and said blank.

3. Apparatus for forming glass optical devices by controlled decomposition of a glass blank comprising means for providing a film of one ingredient of a glass attacking composition on said blank, a mold mounted for movement into and out of contact with said blank, means for providing a film of another ingredient of a glass attacking composition on said mold, means for moving said mold into contact with said blank to produce a film of said glass attacking composition on said blank at the points contacted by said mold and means for cleaning the surfaces of said mold and said blank.

4. Apparatus for forming glass optical devices by controlled decomposition of a glass blank comprising means for providing an acid film on said blank, a mold mounted for movement into and out of contact with said blank, means for providing a film of fluorine bearing salt on said mold, means for moving said mold into contact with said blank to produce a film of hydrofluoric acid on said blank at the points contacted by said mold and means for cleaning the surfaces of said mold and said blank after each contact of said mold with said blank.

5. Apparatus for forming glass optical devices by controlled decomposition of a glass blank comprising means for providing an acid film on said blank, a mold mounted for movement into and out of contact with said blank, means for providing a film of fluorine bearing salt on said mold, means for moving said mold into contact with said blank to produce a film of hydrofluoric acid on said blank at the points contacted by said mold and means including a source of gaseous substance disposed adjacent said blank and the path of movement of said mold for flowing said gaseous substance over the surfaces of said mold and said blank after each contact of said mold with said blank.

6. Apparatus for forming glass optical devices by controlled decomposition of a glass blank comprising means including a source of acid adjacent said blank for providing an acid film on said blank, a mold mounted for movement into and out of contact with said blank, a source of vaporized fluorine bearing salt disposed adjacent the path of movement of said mold for providing a film of fluorine bearing salt on said mold, means including a source of gaseous substance disposed adjacent said blank and the path of movement of said mold for flowing said gaseous substance over the surfaces of said mold and said blank after each contact of said mold with said blank.

7. Apparatus for forming glass optical devices by controlled decomposition of a glass blank, means including a source of acid adjacent said blank for providing an acid film on said blank, a mold mounted for movement into and out of contact with said blank, a source of vaporized fluorine bearing salt disposed adjacent the path of movement of said mold for providing a film of fluorine bearing salt on said mold, means for moving said mold into contact with said blank to produce a film of hydrofluoric acid on said blank at the points contacted by said mold and means including a source of gaseous substance disposed adjacent said blank and the path of movement of said mold for flowing said gaseous substance over the surfaces of said mold and said blank after each contact of said mold with said blank.

8. Apparatus for forming glass optical devices by controlled decomposition comprising a cooling device, means for supporting a glass blank adjacent said cooling device, a source of vaporized acid associated with said blank for providing an acid-vapor atmosphere about said blank, a mold mounted for movement into and out of contact with said blank, a source of vaporized fluorine bearing salt associated with said mold for providing a deposit of fluorine bearing salt on said mold and means including a source of gaseous substance disposed adjacent said blank and the path of movement of said mold for flowing said gaseous substance over the surfaces of said mold and said blank after each contact of said mold with said blank.

9. Apparatus for forming glass optical devices by controlled decomposition comprising a cooling device, means for supporting a glass blank adjacent said cooling device, a source of vaporized acid associated with said blank for providing an acid-vapor atmosphere about said blank, a mold mounted for movement into and out of contact with said blank, a source of vaporized fluorine bearing salt disposed adjacent the path of movement of said mold for providing a deposit of fluorine bearing salt vapor on said mold, a plurality of jets disposed adjacent said blank and the path of movement of said mold and means for flowing a gaseous substance through said jets and over the surfaces of said mold and said blank after each contact of said mold with said blank.

10. Apparatus for forming glass optical devices by controlled decomposition comprising a cooling device, means for supporting a glass blank adjacent said cooling device, a source of vaporized acid adjacent said blank for providing an acid-vapor atmosphere about said blank, reciprocable means disposed adjacent said blank, a mold movable with said reciprocable means for movement into and out of contact with said blank, a source of vaporized fluorine bearing salt disposed adjacent the path of movement of said mold for providing a deposit of fluorine bearing salt vapor on said mold, a plurality of jets disposed adjacent said blank and the path of movement of said mold and means operatively associated with said reciprocable means for flowing a gaseous substance through said jets and over the surfaces of said mold and said blank after each contact of said mold with said blank.

11. Apparatus for forming glass optical devices by controlled decomposition comprising a cooling device, means for supporting a glass blank adjacent said cooling device, a source of vaporized acid associated with said blank for providing an acid-vapor atmosphere about said blank, a mold mounted for movement into and out of contact with said blank, a source of vaporized fluorine bearing salt disposed adjacent the path of movement of said mold for providing a deposit of fluorine bearing salt vapor on said mold, a source of steam, a plurality of jets connected to said source of steam and disposed adjacent said blank and the path of movement of said mold and means for flowing steam through said jets and over the surfaces of said mold and said blank after each contact of said mold with said blank.

12. Apparatus for forming glass optical devices by controlled decomposition comprising a cooling device, means for supporting a glass blank adjacent said cooling device, a source of vaporized acid adjacent said blank for providing an acid-vapor atmosphere about said blank, reciprocable means disposed adjacent said blank, a mold mounted on said reciprocable means for movement into and out of contact with said blank, a source of vaporized fluorine bearing salt disposed adjacent the path of movement of said mold for providing an atmosphere of fluorine bearing salt vapor around said mold, a source of gaseous substance, a plurality of jets connected to said source of gaseous substance and disposed adjacent said blank and the path of movement of said mold and valve means operatively associated with said reciprocable means for flowing said gaseous substance through said jets and over the surfaces of said mold and said blank after each contact of said mold with said blank.

13. Apparatus for forming glass optical devices by controlled decomposition comprising a cooling device, means for supporting a glass blank adjacent said cooling device, a source of vaporized acid adjacent said blank for providing an acid-vapor atmosphere about sand blank, reciprocable means disposed adjacent said blank, a mold mounted on said reciprocable means for movement into and out of contact with said blank, a source of vaporized fluorine bearing salt disposed adjacent the path of movement of said mold for providing an atmosphere of fluorine bearing salt vapor around said mold, a source of steam, a plurality of jets connected to said source of steam and disposed adjacent said blank and the path of movement of said mold and valve means operatively associated with said reciprocable means for flowing steam through said jets and over the surfaces of said mold and said blank after each contact of said mold with said blank.

14. Apparatus for forming glass optical devices by controlled decomposition comprising a heat-absorbing device, means for supporting a glass blank in contact with said heat-absorbing device, a source of vaporized acid adjacent said blank for providing an acid-vapor atmosphere about said blank, reciprocable means disposed in alignment with said blank, a mold mounted on said reciprocable means for movement into contact with said blank, a source of vaporized fluorine bearing salt disposed adjacent the path of movement of said mold for providing an atmosphere of fluorine bearing salt vapor adjacent the path of movement of said mold, a source of gaseous substance, a plurality of jets connected to said source of gaseous substance and disposed adjacent said blank and the path of movement of said mold and valve means operatively associated with said reciprocable means for flowing said gaseous substance through said jets and over the surfaces of said mold and said blank after each contact of said mold and said blank.

15. Apparatus for forming glass optical devices by controlled decomposition comprising a heat-absorbing device, means for supporting a glass blank in contact with said heat-absorbing device, a source of vaporized acid adjacent said blank for providing an acid-vapor atmosphere about said blank, reciprocable means disposed in alignment with said blank, a mold mounted on said reciprocable means for movement into and out of contact with said blank, a source of vaporized fluorine bearing salt disposed adjacent the path of movement of said mold for providing an atmosphere of fluorine bearing salt vapor around said mold, a source of steam, a plurality of jets connected to said source of steam and disposed adjacent said blank and the path of movement of said mold and valve means operatively associated with said reciprocable means for flowing steam through said jets and over the surfaces of said mold and said blank after each contact of said mold with said blank.

16. The method of forming glass optical devices comprising the steps of forming a film of acid on a glass blank, simultaneously forming a film of fluorine bearing salt on the surface of a mold, moving said mold into contact with said blank to produce a film of hydrofluoric acid on said blank at the points contacted by said mold and flowing a gaseous substance at high velocity over the surfaces of said mold and said blank after each contact of said mold with said blank.

17. The method of forming glass optical devices comprising the steps of forming a film of acid on a glass blank, simultaneously forming a film of fluorine bearing salt on the surface of a mold, uniting portions of said films on the high points of said blank to produce a film of hydrofluoric acid on said blank at said points and cleaning the surfaces of said mold and said blank.

18. The method of forming glass optical devices comprising the steps of forming a film of one ingredient of a glass attacking composition on a glass blank, forming a film of another ingredient of a glass attacking composition on the surface of a mold, uniting portions of said films on the high points of said blank to produce a glass attacking film on said blank at said points and cleaning the surfaces of said mold and said blank.

19. The method of forming glass optical devices comprising the steps of forming a film of one ingredient of a glass attacking composition on a glass blank, forming a film of another ingredient of a glass attacking composition on the surface of a mold, uniting portions of said films on the high points of said blank to produce a glass attacking film on said blank at said points and removing said glass attacking film.

FRANÇOIS CHARLES
PIERRE HENROTEAU.

REFERENCES CITED

The following references are of record in the file of this patent:

UNITED STATES PATENTS

| Number | Name | Date |
| --- | --- | --- |
| 2,328,533 | Walker | Aug. 31, 1943 |
| 2,372,535 | Walker | Mar. 27, 1945 |
| 2,384,638 | Penberthy | Sept. 11, 1945 |